(12) United States Patent
Polin et al.

(10) Patent No.: US 10,830,210 B2
(45) Date of Patent: Nov. 10, 2020

(54) EMERGENCY WIND TURBINE SYSTEM COMPRISING A DEVICE FOR ROTATABLY LOCKING THE TURBINE

(71) Applicant: Safran Electrical & Power, Blagnac (FR)

(72) Inventors: Eric Joseph Etienne Polin, Blagnac (FR); Julien Guiraud, Yerres (FR)

(73) Assignee: Safran Electrical & Power, Blagnac (FR)

( * ) Notice: Subject to any disclaimer, the term of this patent is extended or adjusted under 35 U.S.C. 154(b) by 0 days.

(21) Appl. No.: 16/060,772

(22) PCT Filed: Dec. 7, 2016

(86) PCT No.: PCT/FR2016/053246
§ 371 (c)(1),
(2) Date: Jun. 8, 2018

(87) PCT Pub. No.: WO2017/098148
PCT Pub. Date: Jun. 15, 2017

(65) Prior Publication Data
US 2018/0363495 A1    Dec. 20, 2018

(30) Foreign Application Priority Data
Dec. 11, 2015   (FR) ..................................... 15 62231

(51) Int. Cl.
*B64D 41/00*   (2006.01)
*F03D 9/32*    (2016.01)
*F01D 21/14*   (2006.01)

(52) U.S. Cl.
CPC ............. *F03D 9/32* (2016.05); *B64D 41/007* (2013.01); *F01D 21/14* (2013.01);
(Continued)

(58) Field of Classification Search
CPC ......... B64D 41/007; F01D 21/14; F03D 9/32; F05B 2220/10; F05B 2240/92;
(Continued)

(56) References Cited

U.S. PATENT DOCUMENTS 1,733,891 A    10/1929  Loudy
3,149,678 A     9/1964  Chilman et al.
(Continued)

FOREIGN PATENT DOCUMENTS

GB         2 257 477 A    1/1993

OTHER PUBLICATIONS

International Search Report dated Mar. 9, 2017 in PCT/FR2016/053246 filed Dec. 7, 2016.

*Primary Examiner* — Tulsidas C Patel
*Assistant Examiner* — S. Mikailoff
(74) *Attorney, Agent, or Firm* — Oblon, McClelland, Maier & Neustadt, L.L.P.

(57) ABSTRACT

An emergency wind turbine system for an aircraft including an outer structure in which an opening is made includes an emergency wind turbine including: a mast; a turbine including a body mounted on the mast that rotates about an axis of rotation, and a single blade or two blades extending radially from the body between a blade root and a blade head; a locking device to lock rotation of the turbine body about the axis of rotation, when the emergency wind turbine moves between retracted and deployed positions, such that the blade root axis forms an acute locking angle with an orthogonal projection of the longitudinal axis of the mast over a plane substantially perpendicular to the axis of rotation of the turbine and in which the blade root axis extends, to reduce the volume swept by the turbine when it moves between the retracted and deployed positions.

5 Claims, 6 Drawing Sheets

(52) U.S. Cl.
CPC ....... *F05B 2220/10* (2013.01); *F05B 2240/92* (2013.01); *F05B 2240/923* (2013.01); *F05D 2220/34* (2013.01); *Y02E 10/728* (2013.01); *Y02T 50/671* (2013.01)

(58) Field of Classification Search
CPC ........... F05B 2240/923; F05D 2220/34; Y02E 10/728; Y02T 50/671
See application file for complete search history.

(56) References Cited

U.S. PATENT DOCUMENTS

| | | | | |
|---|---|---|---|---|
| 4,717,095 | A * | 1/1988 | Cohen | B64D 41/007 244/58 |
| 5,123,614 | A * | 6/1992 | Whitehouse | B64D 41/007 244/102 SL |
| 5,820,074 | A * | 10/1998 | Trommer | B64D 41/007 244/58 |
| 6,331,099 | B1 * | 12/2001 | Eccles | B64D 41/007 416/142 |
| 8,931,734 | B2 * | 1/2015 | Russ | B64D 41/007 244/58 |
| 9,878,800 | B2 * | 1/2018 | Russ | B64D 41/007 |
| 2007/0237640 | A1 | 10/2007 | Russ | |
| 2013/0256453 | A1 * | 10/2013 | Russ | B64D 41/007 244/54 |
| 2014/0070049 | A1 | 3/2014 | Russ et al. | |
| 2015/0096437 | A1 * | 4/2015 | Russ | B64D 41/007 92/63 |

* cited by examiner

EMERGENCY WIND TURBINE SYSTEM COMPRISING A DEVICE FOR ROTATABLY LOCKING THE TURBINE

GENERAL TECHNICAL FIELD

The present invention relates to an aircraft emergency wind turbine system.

PRIOR ART

It is known to equip aircraft, particularly airplanes, with an emergency wind turbine (or "ram air turbine") which is used as an emergency electrical energy source in the event of loss of the main electrical generators of the aircraft. This occurs for example in the event of a simultaneous failure of the engines of the aircraft. During operation, the emergency wind turbine allows the electrical energy necessary for the vital systems of the aircraft to be produced, such as for example the system and the actuators for monitoring and flight control.

An aircraft emergency wind turbine system 1 known from the prior art is for example illustrated in FIG. 1. Such a system conventionally comprises an aircraft structure 2, an emergency wind turbine 3 and a hatch 4.

The emergency wind turbine 3 comprises a mast 5 connected to the aircraft structure 2 via an actuating ram 6 as well as a turbine 7 comprising a body 8 mounted in rotation on the mast 5 around an axis of rotation 9 and two blades 10 extending radially from the body 8 along a same blade axis 11. The emergency wind turbine 3 can also comprise an electrical generator (not shown) coupled to the turbine 7, so that the rotation of the turbine 7 via the blades 10 causes the production of electrical energy by the electrical generator. The turbine can also generate hydraulic energy. The emergency wind turbine 3 moves with respect to the aircraft structure 2 under the influence of the actuating ram 6, between a retracted position in which the emergency wind turbine 3 is housed in the interior of the fuselage of the aircraft and a deployed position in which the emergency wind turbine 3 extends outside the fuselage of the aircraft, through an opening (not shown) provided in the fuselage of the aircraft.

When the emergency wind turbine 3 is in the deployed position, the turbine 7 extends outside the fuselage of the aircraft and is free in rotation around the axis of rotation 9. Thus, in this position, the flow of exterior air drives in rotation the turbine 7 via the blades 10 and the generator thus produces the electrical energy necessary for the aircraft.

When the emergency wind turbine 3 is in the retracted position, it is known to block the rotation of the turbine 7 around the axis of rotation 9 by means of a blocking device 12. Generally, the turbine 7 is blocked by the blocking device 12 so that the blades 10 are aligned overall with an orthogonal projection of the longitudinal axis 13 along which the mast 5 extends in a plane P' perpendicular to the axis of rotation 9 and into which the blade axis 11 extends. Such a blocked configuration of the turbine 7 allows the bulk of the emergency wind turbine system 1 to be minimized inside the fuselage of the aircraft.

The hatch 4 is connected to the aircraft structure 2 via the actuating ram 6 and moves with respect to said aircraft structure 2 under the influence of said actuating ram 6, between a closed position, in which the hatch 4 blocks the opening provided in the fuselage of the aircraft and the emergency wind turbine 3 is in the retracted position, and an open position in which the hatch 4 frees said opening and the emergency wind turbine 3 is in the deployed position. The opening of the hatch 4 therefore allows the deployment of the emergency wind turbine 3 to the exterior of the fuselage of the aircraft.

Conventionally, the hatch 4 opens to the outside of the fuselage of the aircraft, so that it is necessary to dimension the emergency wind turbine system 1, particularly the actuating ram 6, by taking into account the aerodynamic forces which are applied to the hatch 4 during its opening.

Thus, the greater the surface area of the hatch 4, the greater the aerodynamic forces applied to the hatch 4 and the more the emergency wind turbine system 1 necessitates being over-dimensioned to take up these forces.

However, this over-dimensioning causes an excess of mass which is contrary to the desire of aviation manufacturers to reduce the mass of aircraft.

There is therefore a need to reduce the surface area of the hatch 4 of emergency wind turbine systems 1.

PRESENTATION OF THE INVENTION

The present invention responds to this need by proposing an emergency wind turbine system wherein the turbine is blocked in rotation around its axis of rotation, when it is deployed toward the exterior of an external surface of the aircraft, in a position such that the volume swept by the emergency wind turbine system during its movement toward the outside of the external surface of the aircraft is reduced.

More precisely, the present invention has as its object an emergency wind turbine system comprising an external surface in which an opening is provided, said emergency wind turbine system comprising:

an aircraft structure, an emergency wind turbine connected to the aircraft structure and configured to move with respect to the aircraft structure between a retracted position in which the emergency wind turbine is housed in the interior of the external surface of the aircraft and a deployed position in which the emergency wind turbine extends outside the external surface of the aircraft, through the opening provided in the external surface, the emergency wind turbine comprising:

a mast extending along a longitudinal axis and connected to the aircraft structure, a turbine comprising a body mounted in rotation on the mast around an axis of rotation, and a single blade or two blades extending radially from the body between a blade root housed in the body and a blade tip, the blade root(s) extending along a same blade root axis, disposed substantially perpendicular to the axis of rotation of the turbine, a blocking device configured to block the rotation of the body of the turbine around the axis of rotation when the emergency wind turbine system moves between the retracted position and the deployed position, in a position such that the blade root axis forms a blocking angle, acute and non-zero, with an orthogonal projection of the longitudinal axis of the mast on a plane substantially perpendicular to the axis of rotation of the turbine and in which the blade root axis extends, so as to reduce the volume swept by the emergency wind turbine when it moves between the retracted position and the deployed position.

Preferably, the blocking angle is an angle greater than or equal to 10°, and strictly less than 90°.

Preferably, the blocking angle is an angle comprised between 10 and 45°.

Preferably, the emergency wind turbine system comprises a hatch connected to the aircraft structure and configured to move with respect said aircraft structure between a closed position in which the hatch is designed to block the opening provided in the external surface and the emergency wind turbine is in the retracted position, and an open position in which the hatch is designed to free said opening and to extend outside the external surface of the aircraft and the emergency wind turbine is in the deployed position.

The invention also has as its object an aircraft comprising an external surface in which an opening and an emergency wind turbine system as previously described are provided, wherein the aircraft structure is attached to the external surface.

The present invention also has as its object a method of blocking in rotation a turbine of an emergency wind turbine system as previously described, comprising a step during which said emergency wind turbine moves between the retracted position and the deployed position, and during which the rotation of the turbine around the axis of rotation is blocked in a position such that the blade root axis forms a blocking angle, acute and non-zero, with an orthogonal projection of the mast on a plane substantially perpendicular to the axis of rotation of the turbine and in which the blade root axis extends, the volume swept by the emergency wind when it is moving between the retracted position and the deployed position thus being reduced.

PRESENTATION OF THE FIGURES

Other features, aims and advantages of the present invention will appear upon reading the detailed description that follows, and with reference to the appended drawings given by way of non-limiting examples and in which.

DETAILED DESCRIPTION

Figure 1:
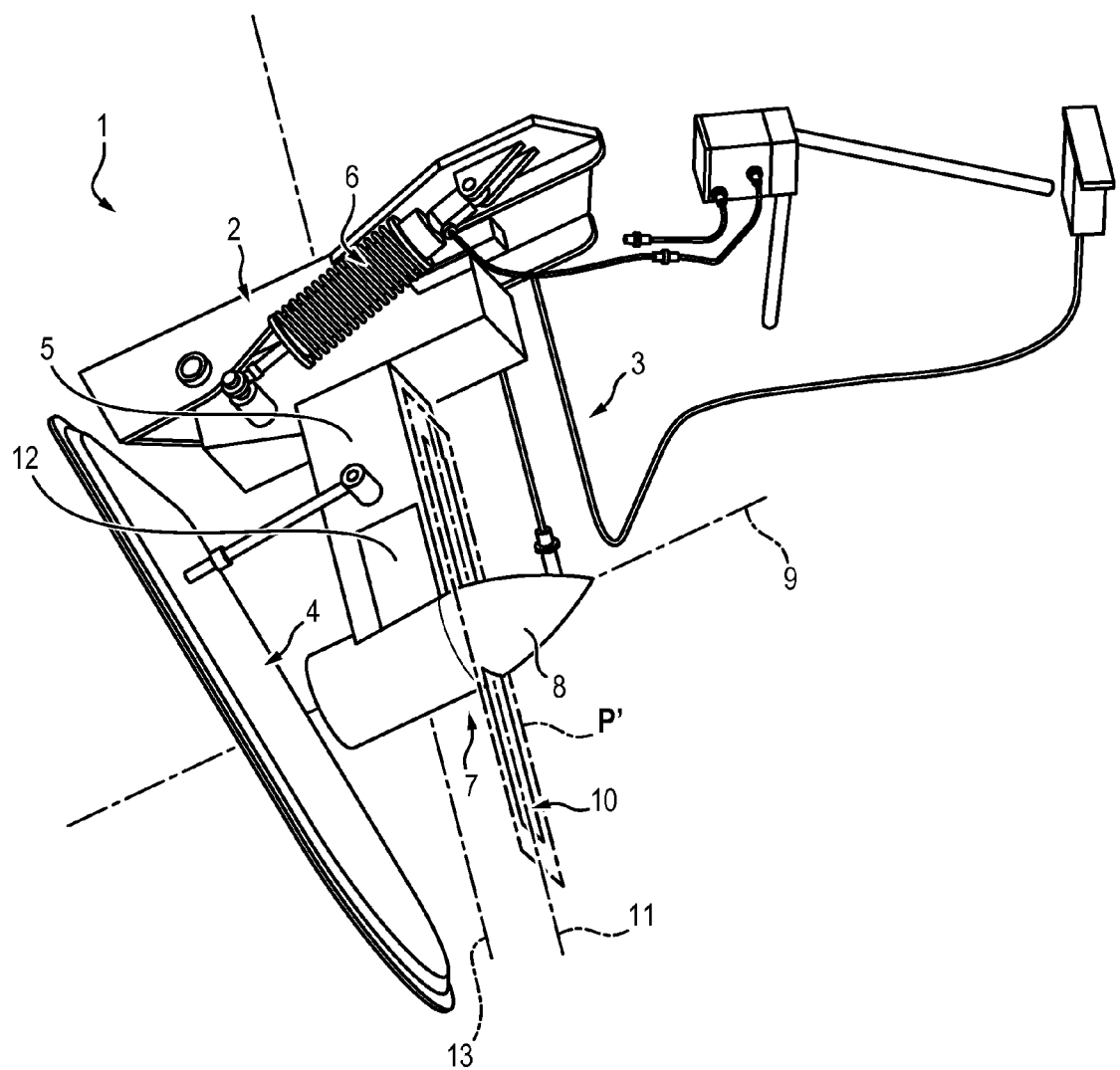
FIG. 1 (already described) shows a schematic view in perspective of an emergency wind turbine system known from the prior art.
Figure 2:
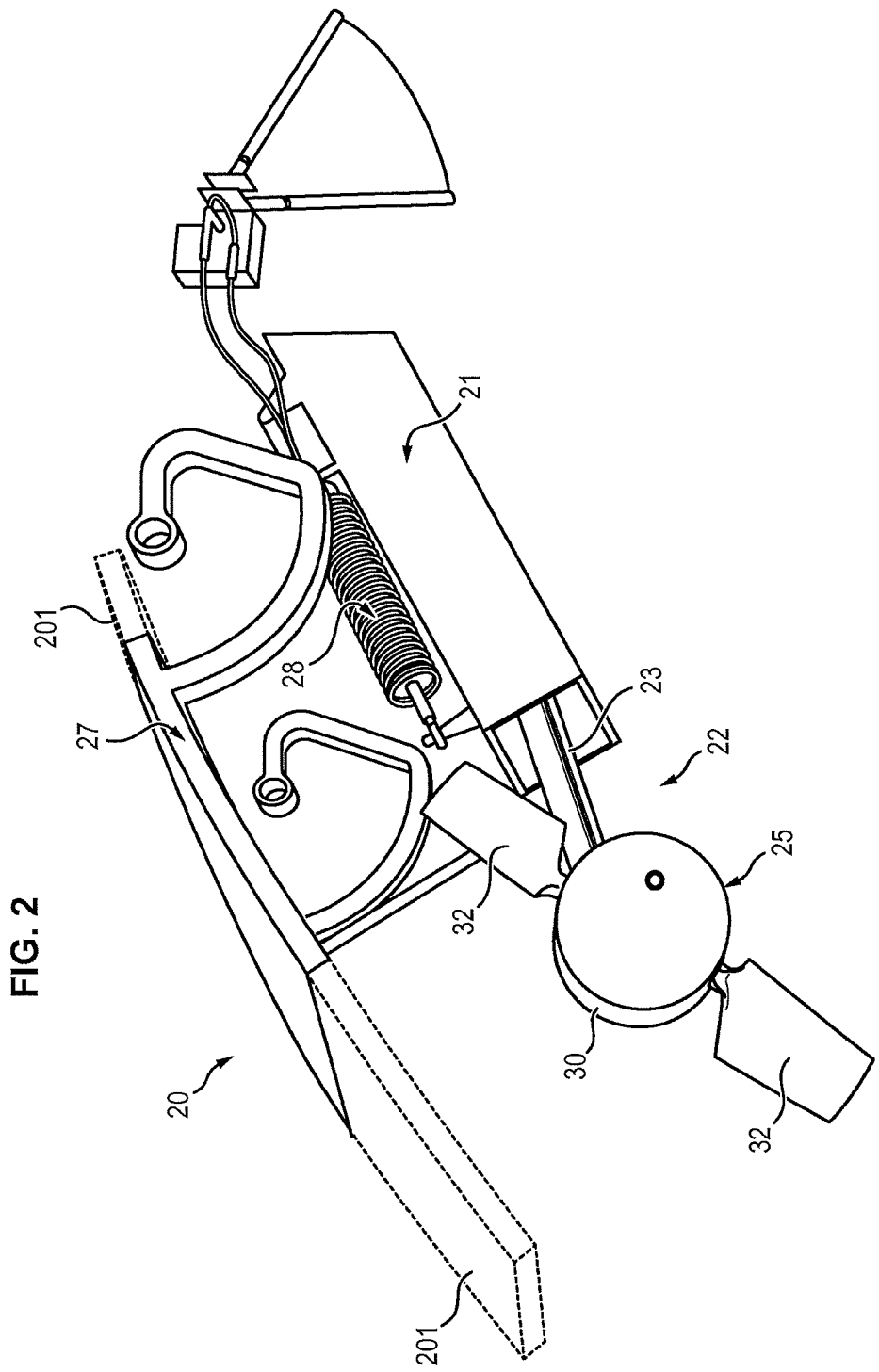
FIG. 2 shows a perspective view of an emergency wind turbine system according to one embodiment of the invention.

FIG. 2 shows an emergency wind turbine system 20 of an aircraft, in particular an airplane. The aircraft comprises an external surface 201 defining the limit between the interior and the exterior of the aircraft and in which an opening is provided.

The external surface 201 of the aircraft corresponds for example to the fuselage of the aircraft. In this case, and when the aircraft is an airplane, the emergency wind turbine system 20 is for example positioned on the underbelly of the airplane or the nose of the airplane.

As a variant, the external surface 201 corresponds to the wing surface, to the fairing or to the landing gear of the aircraft. By "fairing" is meant here the fixed structure element(s) covering the protruding portions of the aircraft and designed to reduce their resistance to the aerodynamic flow. Fairing is used in particular for covering the portions which constitute a volume external to the fuselage or to the wing of the aircraft.

The emergency wind turbine system 20 comprises an aircraft structure 21 attached to the external surface 201, an emergency wind turbine 22 (also called a "ram air turbine" or RAT), and a hatch 27.

The emergency wind turbine 22 is connected to the aircraft structure 21 and is configured to move with respect to the aircraft structure 21 between a position called retracted in which the emergency wind turbine 22 is housed in the interior of the external surface 201 of the aircraft and a position called deployed in which the emergency wind turbine 22 extends outside the external surface 201 of the aircraft, through the opening provided in the external surface 201. The emergency wind turbine 22 is for example connected to the aircraft structure by an actuating ram 28 and moves under the influence of this actuating ram 28 between the retracted position and the deployed position.

The hatch 27 is connected to the aircraft structure 21 and is configured to move with respect to the aircraft structure 21 between a position called closed in which the hatch 27 blocks the opening provided in the external surface 201 of the aircraft, and a position called open in which the hatch 27 frees the opening and extends outside the external surface 201 of the aircraft. When the hatch 27 is in the closed position, the emergency wind turbine 22 is in the retracted position, while when the hatch 27 is in the open position, the emergency wind turbine 22 is in the deployed position.

The hatch 27 is for example connected to the aircraft structure 21 via the actuating ram 28 and moves under the influence of this actuating ram 28 between the closed position and the open position. The hatch 27 and the emergency wind turbine 22 move simultaneously under the influence of the actuating ram 28. More precisely, the emergency wind turbine system 20 comprises a crank which connects the hatch 27 to a mast 23 of the emergency wind turbine 22, so that when the actuating ram 28 moves the mast 23 of the emergency wind turbine 22, it also moves the hatch 27 via the crank.

Figure 3:
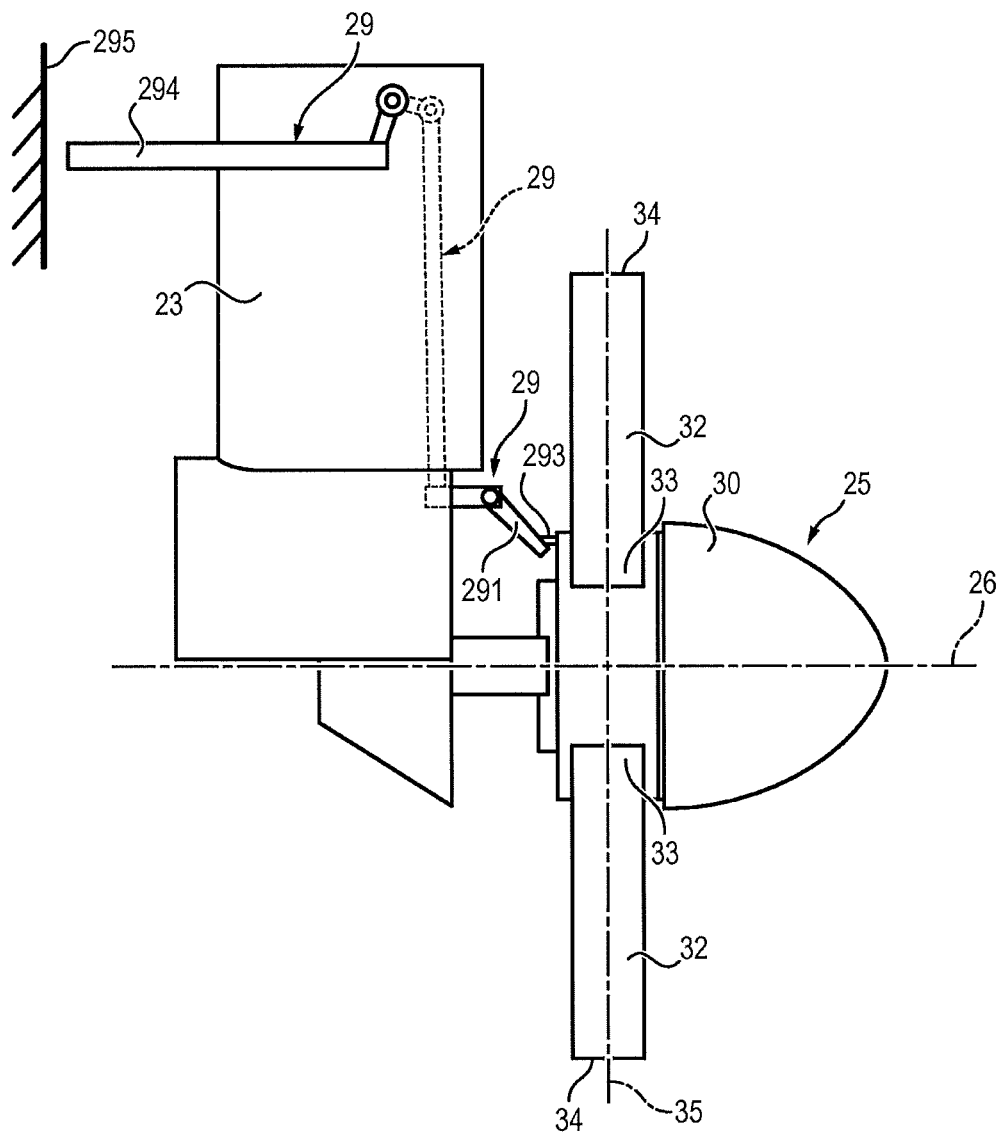
FIG. 3 shows a section view of the emergency wind turbine of the emergency wind turbine system illustrated in FIG. 2.

FIG. 3 shows in more detail the emergency wind turbine 22. The emergency wind turbine 22 comprises:
- a mast 23 extending along a longitudinal axis 24 and connected by a first end to the aircraft structure 21,
- turbine 25 connected to a second end of the mast 23 and configured to pivot around an axis of rotation 26, the axis of rotation 26 and the longitudinal axis 24 being non-parallel and not congruent, and
- a device 29 for blocking the rotation of the turbine 25 around said axis of rotation 26.

The turbine 25 comprises a body 30 mounted in rotation on the mast 23 around said axis of rotation 26. The body 30 of the turbine 25 is for example coupled to an electrical generator (not shown), so that the rotation of the body 30 of the turbine 25 around the axis of rotation 26 causes the production of electrical energy by the electrical generator. As a variant, the turbine 25 can produce hydraulic energy.

The turbine 25 also comprises a single blade or two blades 32. The blade(s) 32 extend radially from the body 30 of the turbine 25 between a blade root 33 housed in the body 30 of the turbine 25 and a blade tip 34 positioned outside the body 30.

The blade root 33 of the or of each blade 32 extends along a blade root axis 35, disposed substantially perpendicular to the axis of rotation 26 of the turbine 25.

What is means by "substantially perpendicular" is the fact that the blade root axis 35 is perpendicular to the axis of rotation 26 within 2°. When the turbine 25 comprises two blades 32, their blade roots extend along the same blade root axis 35.

The blade root 33 of the or of each of the blades 32 is connected to the body 30 of the turbine 25 so that the rotation of the blade(s) 32 around the axis of rotation 26 causes the rotation of the body 30 of the turbine 25 around said axis of rotation 26 and thus the production of electrical energy by the electrical generator.

The blocking device 29 is configured to block the rotation of the body 30 of the turbine 25 around the axis of rotation 26, when the emergency wind turbine 22 moves between the retracted position and the deployed position, and to free the rotation of the body 30 of the turbine 25 around the axis of rotation 26, at least when the emergency wind turbine 22 is in the deployed position. The blocking device 29 can also block the rotation of the body 30 of the turbine 25 around the axis of rotation 26 when the emergency wind turbine 22 is in the retracted position. When the blocking device 29 blocks the body 30 of the turbine 25 in rotation, the turbine 25 is in the position called blocked.

The blocking device 29 thus allows avoiding having the blades 32 begin to rotate when the emergency wind turbine 22 moves between its retracted position and the deployed position, or when the emergency wind turbine 22 is in the retracted position, damaging the aircraft as a result, particularly the external surface 201 and/or the hatch 27.

Figure 4:
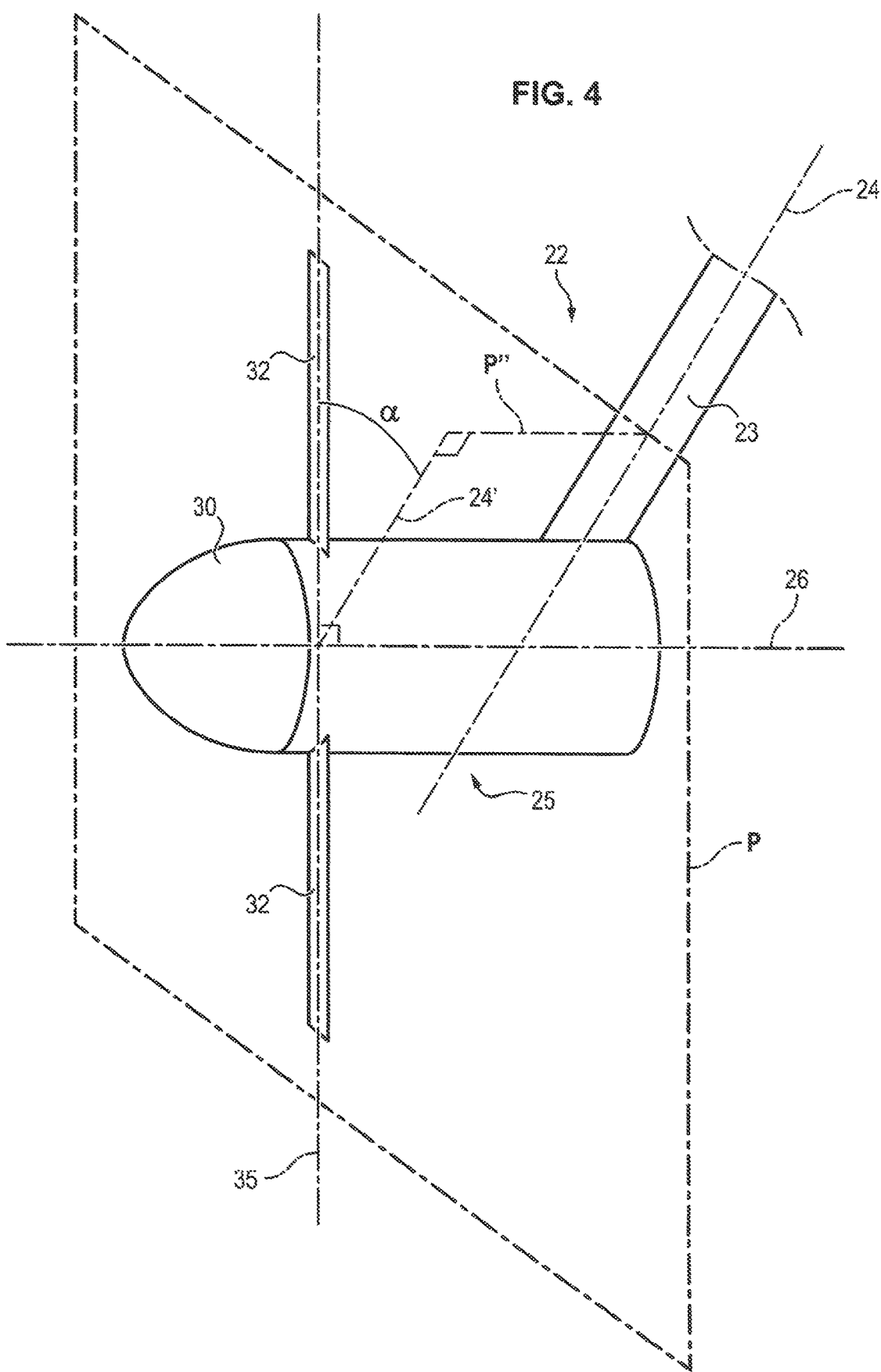
FIG. 4 shows a schematic view, in perspective, of the emergency wind turbine illustrated in FIG. 3, when the turbine is in the blocked position.
Figure 5:
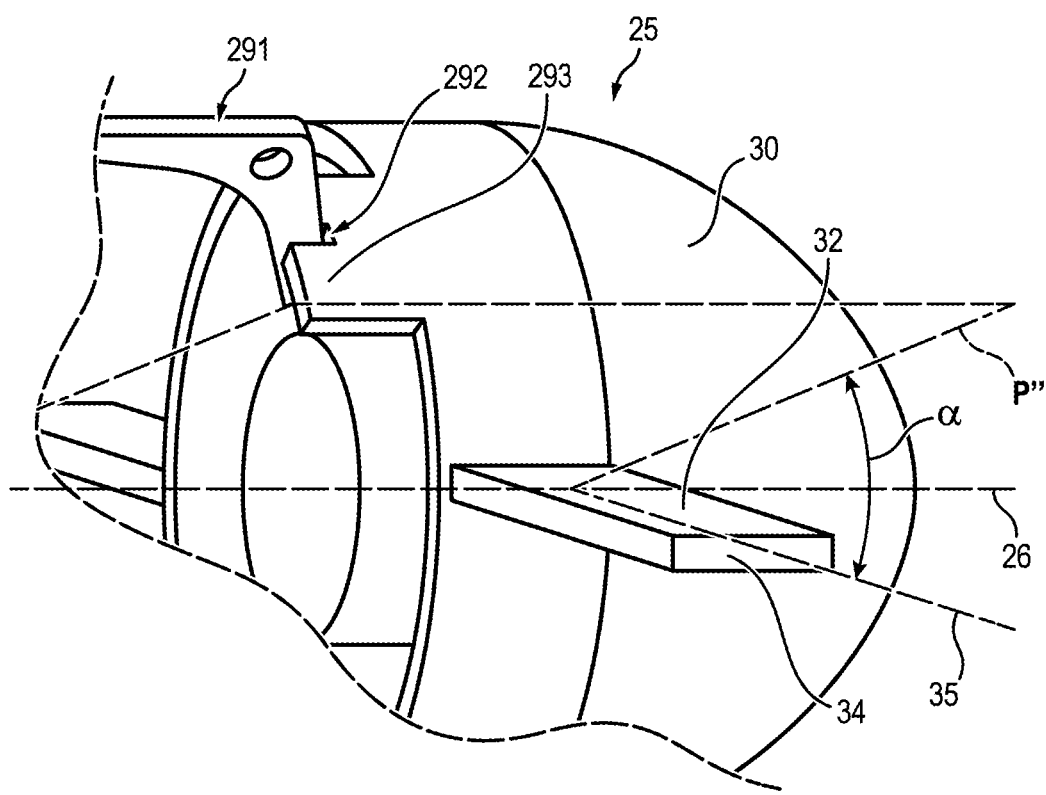
FIG. 5 shows a detail view of the device for blocking in rotation the turbine of the emergency wind turbine illustrated in FIG. 3.
Figure 6:
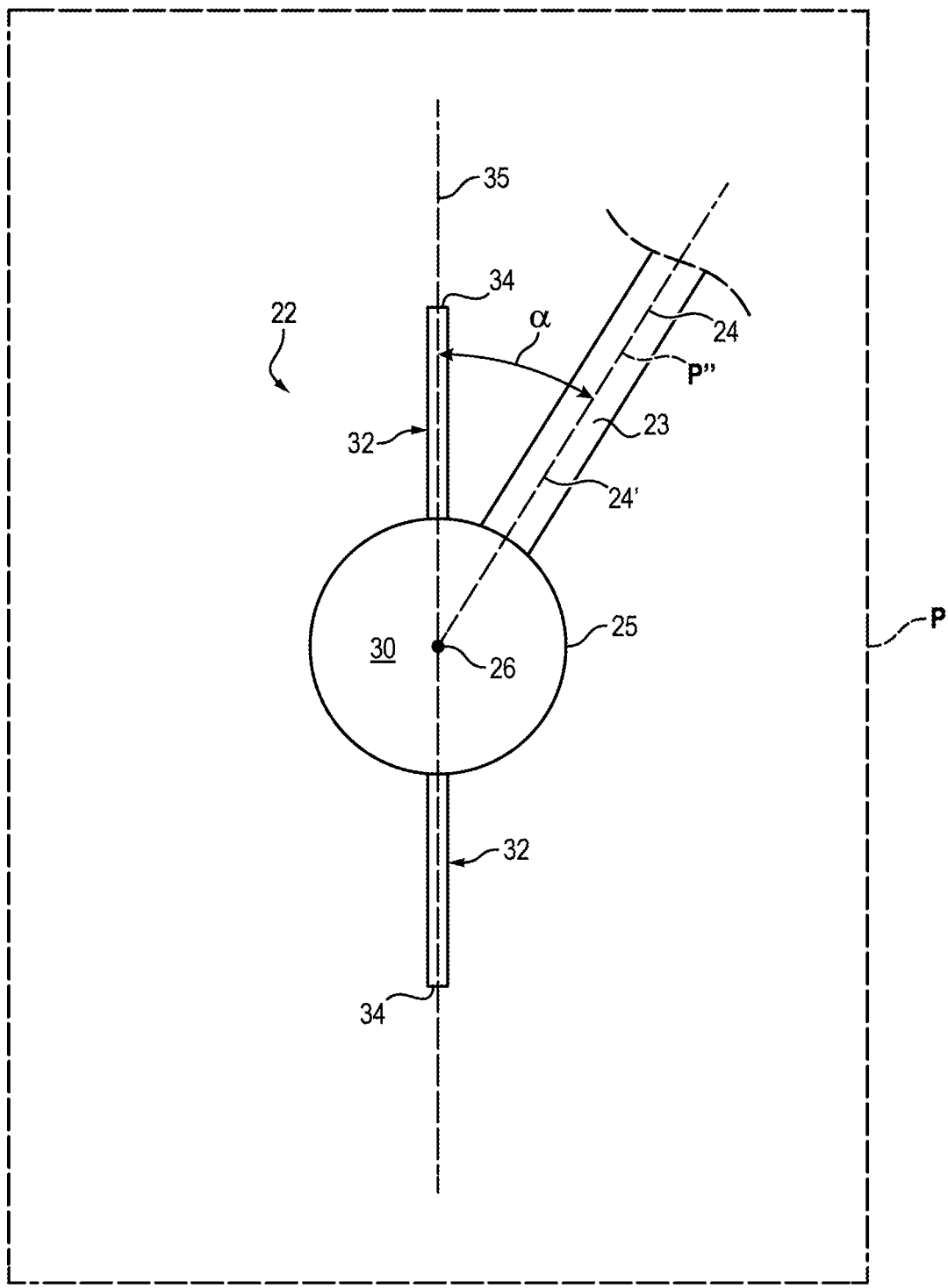
FIG. 6 shows a schematic front view of the emergency wind turbine illustrated in FIG. 3, when the turbine is in the blocked position.

The turbine 25, in the position blocked by the blocking device 29, is schematically illustrated in FIGS. 4 to 6.

More precisely, when the turbine 25 is in the blocked position, the blade root axis 35 forms a blocking angle α, acute and non-zero, with an orthogonal projection 24' of the longitudinal axis 24 of the mast 23 on a plane P substantially perpendicular to the axis of rotation 26 of the turbine 25 and into which the blade root axis 35 extends, so as to reduce the volume swept by the emergency wind turbine 22 when it moves between the retracted position and the deployed position. By "substantially perpendicular" is meant the fact that the plane P is perpendicular to the axis of rotation 26 within 2°.

In fact, the applicant noticed surprisingly that by blocking the blade(s) 32 at the blocking angle α, acute and non-zero, the volume swept by the emergency wind turbine 22, when it moves between the retracted position and the deployed position, is reduced and as a result the intersection between the external surface 201 of the aircraft and this volume forms a smaller surface than when the blade(s) 32 are blocked at a blocking angle zero. Consequently, the cross-section of the opening provided in the external surface 201 of the aircraft, and thus the surface area of the hatch 27 which encloses it, which are necessary for the deployment of the emergency wind turbine 22 to the outside of the external surface 201 of the aircraft, can be reduced. This makes it possible to cause a reduction in the aerodynamic forces applied to the hatch 27, during its opening to the outside of the external surface 201 of the aircraft, and thus to avoid over-dimensioning of the emergency wind turbine system 20 which would lead to an increase in mass of the emergency wind turbine system 20.

By an "acute and non-zero angle" is meant here an angle greater than or equal to 10° and strictly less than 90°.

According to a preferred embodiment of the invention, the blocking angle α is an angle comprised between 10 and 45°.

Preferably, the blocking device 29 is configured to block the rotation of the body 30 of the turbine 25 around the axis of rotation 26, when the emergency wind turbine 22 moves between the retracted position and a position called intermediate, comprised between the retracted position and the deployed position, and to free the rotation of the body 30 of the turbine 25 around the axis of rotation 26 when the emergency wind turbine 22 moves between the intermediate position and the deployed position. When the emergency wind turbine 22 is in the intermediate position, the turbine 25 is disposed outside the external surface 201 of the aircraft and is sufficiently distant from said external surface 201 of the aircraft and from the aircraft structure 21 to avoid having the rotation of the blades 32 damage them. What is meant by "sufficiently distant" is the fact that the turbine 25, particularly the blades, is at least 25 mm away from the external surface 201 of the aircraft.

The blocking device 29 comprises for example a guard locking pin 291 and a notch 292 provided in the body 30 of the turbine 25 and configured to receive the guard locking pin 291, thus retaining the turbine 25 in the blocked position. The guard locking pin 291 and the notch 292 are configured in such a manner that the blade root axis 35 forms the blocking angle α with the orthogonal projection 24' of the longitudinal axis 24 of the mast 23 when the guard locking pin 291 is engaged in the notch 292. In the example illustrated in FIG. 5, the guard locking pin 291 and the notch 292 are both comprised in the plaine P" formed by the axis of rotation 26 of the body 30 of the turbine 25 and the longitudinal axis 24 of the mast 23, when the turbine 25 is in the blocked position.

In the example illustrated in FIGS. 3 to 5, the guard locking pin 291 and the notch 292 are both comprised in the plane formed by the axis of rotation 26 of the body 30 of the turbine 25 and the longitudinal axis 24 of the mast 23, when the turbine 25 is in the blocked position. In this example, the notch 292 is angularly offset from the blade root axis 35 around the axis of rotation 26 by an angle corresponding to the blocking angle α.

In the example illustrated in FIG. 5, the body 30 is extended around the axis of rotation 26 by a platform 293 in which the notch 292 is created.

In the example illustrated in FIG. 5, the blocking device 29 comprises two notches 292 provided in the body 30 of the turbine 25 in a diametrically opposed manner. A platform 293 can then be associated with each of the notches 292 as is also illustrated in FIG. 5.

The blocking device 29 also comprises for example a system of cranks 294 (FIG. 3) connected to the guard locking pin 291 and configured to disengage the guard locking pin 291 from the opening 292 when it is actuated, and thus to de-block the rotation of the turbine 25. The actuation of the system of cranks 294 is for example accomplished by means of an abutment 295 connected to the airplane structure 21. Such a system of cranks 294 is already known to a person skilled in the art; it will therefore not be described here in more detail.

The emergency wind turbine system 20 has the advantage of comprising a blocking device 29 which blocks the rotation of the turbine 25 in a position such that the volume swept by the emergency wind turbine 22 when it is deployed to the outside of the external surface 201 of the aircraft is reduced, which allows a reduction of the surface area of the hatch 27 and therefore a limit to the aerodynamic forces applied to said hatch 27 and which must be taken up by the emergency wind turbine system 20, particularly by the actuating ram 28. Thus, the emergency wind turbine system 20 can be dimensioned by taking into account these weaker aerodynamic forces and the mass of the emergency wind turbine system 20 can be reduced.

The invention claimed is:

1. An emergency wind turbine system for an aircraft comprising an external surface in which an opening is provided, said emergency wind turbine system comprising:
    an aircraft structure; and
    an emergency wind turbine connected to the aircraft structure and configured to move with respect to the aircraft structure between a retracted position in which the emergency wind turbine is housed in an interior of the external surface of the aircraft, and a deployed position, in which the emergency wind turbine extends outside the external surface of the aircraft, through the opening provided in the external surface, the emergency wind turbine comprising:
        a mast extending along a longitudinal axis and connected to the aircraft structure,
        a turbine comprising a body mounted in rotation on the mast around an axis of rotation, and a single blade or two blades extending radially from the body between a blade root housed in the body and a blade tip, the blade root(s) extending along a same blade root axis, disposed substantially perpendicular to the axis of rotation of the turbine, and
        a blocking device configured to block rotation of the body of the turbine around the axis of rotation, when the emergency wind turbine loves between the retracted position and the deployed position,
    wherein the blocking device is configured to block the rotation of the body of the turbine around the axis of rotation, in a position such that the blade root axis forms a blocking angle, acute and non-zero, with an orthogonal projection of the longitudinal axis of the mast on a plane substantially perpendicular to the axis of rotation of the turbine and in which the blade root axis extends, so as to reduce a volume swept by the emergency wind turbine when the emergency wind turbine moves between the retracted position and the deployed position, the blocking angle being an angle comprised between 10° and 45°.

2. The emergency wind turbine system according to claim 1, comprising a hatch connected to the aircraft structure and configured to move with respect to said aircraft structure between a closed position in which the hatch is designed to block the opening provided in the external surface and the emergency wind turbine is in the retracted position, and an open position in which the hatch is designed to free said opening and to extend to the outside of the external surface of the aircraft and the emergency wind turbine is in the deployed position.

3. An aircraft comprising an external surface in which an opening is provided and comprising an emergency wind turbine system according to claim 1, wherein the aircraft structure is attached to the external surface.

4. A method for blocking in rotation a turbine of an emergency wind turbine system according to claim 1, the method comprising:
    moving the emergency wind turbine between the retracted position and the deployed position; and
    blocking the rotation of the turbine around the axis of rotation in the position such that the blade root axis forms the blocking angle, acute and non-zero, with the orthogonal projection of the longitudinal axis of the mast on the plane substantially perpendicular to the axis of rotation of the turbine and in which the blade root axis extends, the volume swept by the emergency wind turbine when the emergency wind turbine moves between the retracted position and the deployed position being thus reduced, the blocking angle being the angle comprised between 10° and 45°.

5. The emergency wind turbine system according to claim 1, wherein the blocking device includes a guard locking pin and a notch provided in the body of the turbine configured to receive the guard locking pin, and
    wherein the guard locking pin and the notch are disposed in a plane formed by the axis of rotation of the turbine and the longitudinal axis of the mast when the rotation of the body of the turbine is blocked.

* * * * *